Sept. 25, 1962       E. A. ZIELINSKI       3,055,381
DUST GUARD FOR A FRESHLY PAINTED MOTOR VEHICLE
Filed Jan. 6, 1960
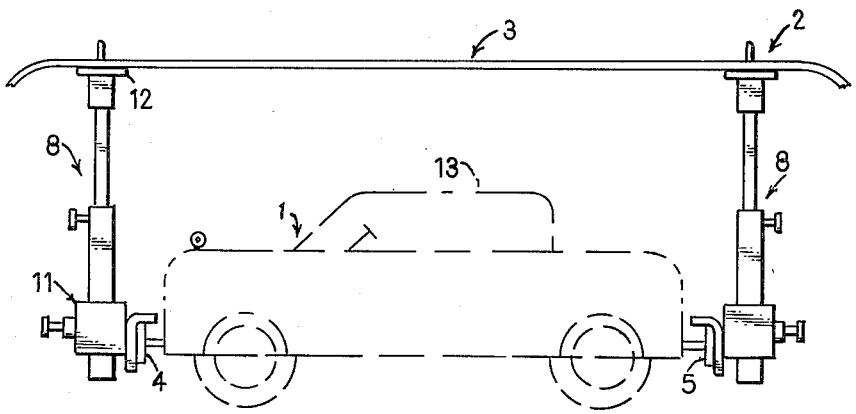
Fig. 1
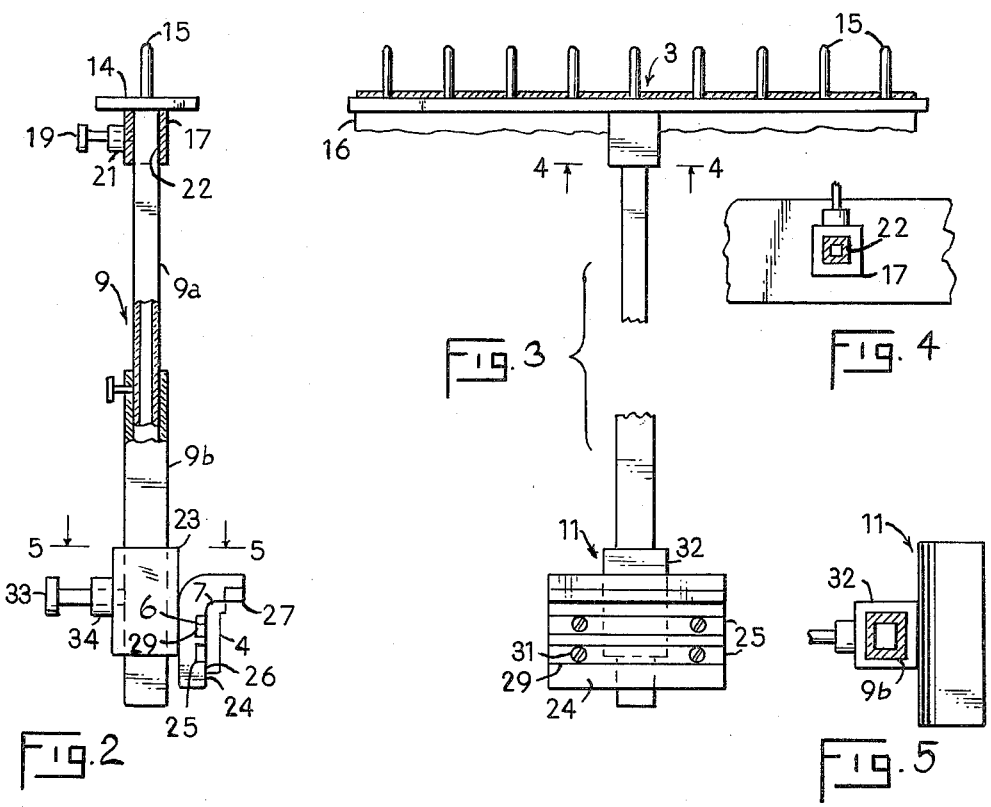
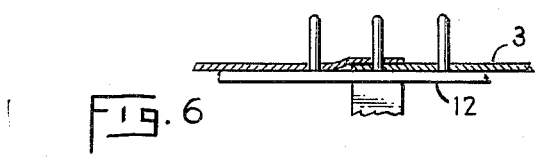
INVENTOR.
EDMUND A ZIELINSKI
BY Nicholas J. Garofalo
his Attorney United States Patent Office 3,055,381
Patented Sept. 25, 1962

3,055,381
DUST GUARD FOR A FRESHLY PAINTED
MOTOR VEHICLE
Edmund A. Zielinski, 14 1st Ave., New York 9, N.Y.
Filed Jan. 6, 1960, Ser. No. 809
1 Claim. (Cl. 135—7.1)

This invention realtes to a dust guard for shielding a freshly painted vehicle in a workshop against dust settling out of the surrounding air.

In automobile workshops there is always present the problem of protecting a freshly painted vehicle from the dust that is generally floating about because of the work being carried on. This problem is particularly difficult to handle in small workshops because of their crowded condition and lack of space.

An object of the present invention is to provide an improved and practical means for effectively protecting a freshly painted motor vehicle from dust settling down from the surrounding air.

A further object of the invention is to provide for a freshly painted motor vehicle a dust guard which is light in weight, can be readily and easily assembled for such purpose, and can be readily and easily disassembled for storage, and which when disassembled may be stored in a minimum of space.

A still further object of the invention is to provide for a freshly painted vehicle a dust guard which is magnetically attachable to the bumpers of the vehicle and provides a disposable roof covering to guard the vehicle against dust settling out of the surrounding air.

In accordance with the invention the dust guard comprises a pair of vertical supports releasably mountable to the end bumpers of a motor vehicle and having a pair of crossarms at their upper ends upon which disposable sheeting material is detachably anchored as a covering roof for the vehicle. The dust guard is of a knockdown structure in that it can be readily disassembled and stored away in a compact bundle; and can be readily assembled when it is to be used.

The invention further lies in its advantageous construction whereby the purposes intended herein are obtained.

The foregoing and other objects and advantages of this invention will appear more fully hereinafter from a consideration of the detailed description which follows, taken in conjunction with the accompanying drawings wherein an embodiment of the invention is illustrated by way of example. It is to be expressly understood, however, that the drawings are for purposes of illustration and description only, and are not intended as a definition of the limits of the invention.

In the drawings:

FIG. 1 is a side elevational view of a dust guard embodying the invention mounted to the end bumpers of a freshly painted motor vehicle in a dust shielding relation to the latter;

FIG. 2 is an enlarged detail in side elevation of one of the standards of the dust guard;

FIG. 3 is a rear elevational view of one of the standards of the dust guard with part broken away for convenience of illustration;

FIG. 4 is a sectional detail taken on line 4—4 of FIG. 3;

FIG. 5 is a sectional detail taken on line 5—5 of FIG. 2; and

FIG. 6 is a detail how the paper sheeting defining the roof may be applied in overlapping relation upon the prongs of the crossarm.

For a more detailed understanding of the invention reference is now directed to the several figures of the drawing wherein like parts are represented by like reference numbers. In the drawings is disclosed a freshly painted motor vehicle 1 in outline, upon which a dust guard 2 embodying the invention is detachably mounted. The latter provides a protective shield or roof 3 above the vehicle which intercepts and blocks dust in the atmosphere from settling down upon the vehicle.

The vehicle has the usual front and rear bumpers 4 and 5 mounted transversely of the front and rear ends of the vehicle. The bumpers have a vertically broad outer flat face 6 which is slightly rounded along its upper longitudinal edge 7. The dust guard 1 comprises a pair of standards 8, each mountable to one of the bumpers of the vehicle, and each adapted to support an end of the roof 3.

A standard 8 includes an elongated vertical support or post 9 releasably mountable in a vertical position to one of the bumpers of the vehicle by means of a mounting clamp 11 at its lower end. An elongated crossarm 12 is centered upon the upper end of the post and extends in a horizontal plane. When the standard is mounted to a bumper of the vehicle, the post thereof extends vertically above the roof 13 of the vehicle and the crossarm extends transversely of the vehicle. The crossarm has a length preferably greater than the width of the vehicle so that when the standard is centered upon a bumper, the crossarm will extend transversely beyond opposite sides of the vehicle. When both standards are centered upon their respective bumpers of the vehicle, the crossarms thereof are in opposed parallel relation. Unitary with the crossarm and arranged lengthwise of its upper surface 14 is a row of vertically extending teeth or pointed prongs 15. The dust guard roof 3 is defined by sheet material 16 stretched over the crossarms in a horizontal plane and anchored or impaled against escape at opposite ends upon the prongs.

The crossarm 12 is detachably mountable to its supporting post 9; and it may be readily separated therefrom when disassembling the standard. To this end, a short sleeve 17 depends integrally from the center of the underside of the crossarm, and is open at its bottom end. An upper end of the post 9 complements the interior of the sleeve in cross section and is adapted to be received with a slide fit into the sleeve through the bottom end of the latter. A manually operable set screw 19 threadable through a bossed portion 21 of the sleeve into tight abutment with the post serves to prevent endwise escape and turning of the crossarm relative to the post. Here, the interior 22 of the sleeve and the complementary end portion of the post 9 are rectilinear in cross section, as appears in FIG. 4.

The mounting clamp 11 is separably associated with its post, and is detachably mountable to one of the bumpers of the motor vehicle. Here, the mounting clamp is designed to be magnetically attachable to the bumper of the vehicle, the bumper being of steel or other magnetic material. A clamp 11 has a body 23 of non-magnetic lightweight material. The body is characterized at its rear by a broad wall 24 carrying a plurality of strong permanent magnets 25. The latter are adapted when placed in contact with the bumper to magnetically grip the latter and to securely hold the mounting clamp fast thereto.

The rear wall 24 of the mounting clamp is vertically flat in its lower portion 26 and is offset rearwardly at right angles in its upper portion 27. The latter portion is adapted to overlie the upper edge 7 of the bumper, while the lower portion 26 is adapted to front the face 6 of the bumper. A light bend or radius is defined at the vertex corner of wall 24 so as to conform substantially with the curvature of the upper edge 7 of the conventional bumper. The magnets are of bar form extending transversely of wall 24, and are mounted in complementary sockets or recesses 29 of the latter. Screws 31 extending through the magnets and threaded into the body of the clamp aid in retaining the magnets in their recesses. At least one of the magnets is disposed in the upper wall portion 27. When the clamp is applied to a bumper, the upper wall portion 27 will overlie and rest upon the upper edge 7; the lower wall portion 26 will front the face 6; and the several magnets will magnetically grip the adjacent areas of the bumper.

The forward portion of the body of the clamp is defined by an open ended vertical sleeve 32. The lower end of the post 9 complements the interior of the sleeve in cross section, and is adapted to be received therein with a slide fit. The post is slidable through the open ends of the sleeve, and is adapted to be vertically adjusted therein to a desired elevation. A manually operable set screw 33 threadable through a bossed portion 34 of the sleeve into tight abutment with the post serves to fix the adjusted position of the post in the sleeve. Here, the interior of the sleeve is rectilinear in cross section, and the post is of complementary section, whereby the one is prevented from turning relative to the other. When the clamp is mounted to a bumper, the sleeve portion of the clamp has a vertical position and the associated post is held vertically erect therein.

To increase the elevated adjustments of the post 9, the latter is formed of two sections 9a and 9b, the former being telescopically slidable into the latter. A set screw serves to fix the adjusted position of the two sections of the post.

The sheet material defining the roof 3 is preferably of strong paper; as for example, building or wrapping paper. While the paper may be of a width slightly greater than that of a crossarm, it may comprise one or more lengths of narrow sheets impaled upon the prongs of the crossarms and disposed relative to one another in slightly overlapping relation, as appears in FIG. 6.

In the use of the device as a dust guard, the clamps 11 are first magnetically gripped to the centers of the end bumpers of the vehicle. Next the lower sections of the posts 9 are arranged in the sleeves of the clamps and are adjusted to equal desired elevations; the upper portions of the posts are then telescoped in position and also adjusted to equal elevations. The sheeting material for the roof 3 is then drawn tight, preferably by a man gripping each end thereof. The end portions of the sheet material are then impaled upon the prongs of the crossarms. The prongs are sharp pointed so as to permit easy impaling of the sheeting thereon. The prongs are also relatively elongated so as to project substantially above the upper surface of the roof 3, whereby the latter is securely anchored upon the prongs and prevented from endwise escape therefrom. The magnets are sufficiently strong enough to hold the clamps and the associated roof in supported relation to the bumpers.

In disassembling the apparatus, the roof 3 is removed and rolled into a bundle; the posts 9 are removed from the clamps 11 and from the crossarms; the posts are shortened to their telescoped condition, and may be rolled up with the roof. The clamps 11 are then forcefully pulled from the bumpers.

While an embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art, and it is my intent, therefore, to claim the invention not only as shown and described but also in all such forms and modifications as may be reasonably construed to be within the spirit of the invention and the scope of the appended claim.

What is claimed is:

In combination with a freshly painted motor vehicle having a bumper transversely of its front end and a bumper transversely of its rear end, a pair of vertically elongated posts, mounting means detachably supporting one of the posts in vertically erect position to one of the bumpers, similar means similarly supporting the other post to the other bumper, the posts having equally elevated positions above the vehicle, a crossarm associated with each post having a length substantially equal to the vehicle, means detachably mounting the crossarm to the uppermost end of the post in transverse relation to the vehicle, paper sheeting extending in a horizontal plane across both crossarms, the terminal ends of the sheeting extending over and beyond the crossarms, a plurality of upright pointed straight prongs unitary with the top surface of each crossarm, and the portions of the sheeting extending across the corresponding crossarms being impaled upon the prongs, whereby the sheeting is retained upon the crossarms, is slidably removable from the prongs in an upward direction, and while impaled on the prongs providing a temporary shield above the vehicle protecting the latter from falling dust, wherein each bumper includes an outer broad flat upright face having a rounded upper edge, and the mounting means comprises a member offset from the lower end of the post facing the face of the bumper and having an upper flanged portion overhanging the rounded edge of the bumper, said offset member and flanged portion including bar magnets embedded therein and disposed parallel to the bumper and in magnetic contact therewith.

References Cited in the file of this patent
UNITED STATES PATENTS

| | | |
|---|---|---|
| 914,795 | Coey | Mar. 9, 1909 |
| 1,448,821 | Andrews | Mar. 20, 1923 |
| 2,508,757 | Gray | May 23, 1950 |
| 2,602,223 | Pauhu | July 8, 1952 |
| 2,642,999 | McPherson | June 23, 1953 |